(12) United States Patent
Millar

(10) Patent No.: US 10,905,052 B2
(45) Date of Patent: Feb. 2, 2021

(54) SYSTEMS AND METHODS FOR MEASURING WATER USAGE IN AN ASSEMBLY LINE GROW POD

(71) Applicant: Grow Solutions Tech LLC, Lehi, UT (US)

(72) Inventor: Gary Bret Millar, Highland, UT (US)

(73) Assignee: GROW SOLUTIONS TECH LLC, Vineyard, UT (US)

( * ) Notice: Subject to any disclaimer, the term of this patent is extended or adjusted under 35 U.S.C. 154(b) by 437 days.

(21) Appl. No.: 15/985,142

(22) Filed: May 21, 2018

(65) Prior Publication Data

US 2018/0359952 A1    Dec. 20, 2018

Related U.S. Application Data

(60) Provisional application No. 62/519,405, filed on Jun. 14, 2017, provisional application No. 62/519,410, filed on Jun. 14, 2017.

(51) Int. Cl.
| | | |
|---|---|---|
| *A01G 9/24* | (2006.01) | |
| *A01G 9/06* | (2006.01) | |
| *A01G 27/00* | (2006.01) | |
| *A01G 31/00* | (2018.01) | |
| *A01G 31/04* | (2006.01) | |

(Continued)

(52) U.S. Cl.
CPC ............... *A01G 9/247* (2013.01); *A01G 9/06* (2013.01); *A01G 27/003* (2013.01); *A01G 31/042* (2013.01); *C02F 1/004* (2013.01); *C02F 1/50* (2013.01); *C02F 1/68* (2013.01); *A01G 2031/006* (2013.01); *C02F 2103/002* (2013.01);

(Continued)

(58) Field of Classification Search
CPC ......... A01G 31/042; A01G 9/247; A01G 9/06
USPC ....................... 422/28, 43, 79, 105, 108, 110
See application file for complete search history.

(56) References Cited

U.S. PATENT DOCUMENTS 3,432,965 A * 3/1969 Smith .................. A01G 31/045
 47/60
5,097,627 A 3/1992 Roberts
(Continued)

FOREIGN PATENT DOCUMENTS

| CN | 206000718 U | 3/2017 |
|---|---|---|
| WO | 2013066254 A1 | 5/2013 |
| WO | 2016147195 A1 | 9/2016 |

OTHER PUBLICATIONS

International Search Report and Written Opinion relating to International Application No. PCT/US2018/034136 dated Nov. 6, 2018.

*Primary Examiner* — Magdalena Topolski
*Assistant Examiner* — Kevin M Dennis
(74) *Attorney, Agent, or Firm* — Dinsmore & Shohl LLP

(57) ABSTRACT

An assembly line grow pod includes a track extending between a growing region and a sanitizing region, a cart movably engaged with the track, a sanitizer system that applies a sanitizer solution to the cart at the sanitizing region, the sanitizer system including a gray solution tank for storing sanitizer solution runoff collected from the sanitizing region, a watering system that provides water to plant matter on the cart at the growing region, the watering system including an untreated water tank for storing water runoff collected from the growing region, and a flowmeter fluidly coupled to at least one of the sanitizer system and the watering system.

16 Claims, 10 Drawing Sheets

(51) Int. Cl.
*C02F 1/50* (2006.01)
*C02F 1/00* (2006.01)
*C02F 1/68* (2006.01)
*C02F 103/00* (2006.01)
*C02F 103/26* (2006.01)

(52) U.S. Cl.
CPC .... *C02F 2103/26* (2013.01); *C02F 2209/003* (2013.01); *C02F 2303/04* (2013.01)

(56) References Cited

U.S. PATENT DOCUMENTS

| | | | |
|---|---|---|---|
| 7,832,144 B2 | 11/2010 | Corradi | |
| 8,234,812 B1 * | 8/2012 | Colless | A01G 9/16 47/61 |
| 8,627,598 B1 * | 1/2014 | Souder | A01G 31/042 47/65 |
| 9,675,014 B2 * | 6/2017 | Hassle | A01C 21/00 |
| 9,795,097 B2 | 10/2017 | Williams et al. | |
| 10,750,687 B2 * | 8/2020 | Everett | G05D 11/131 |
| 2009/0050174 A1 * | 2/2009 | Gheparde | B08B 7/0071 134/1 |
| 2012/0192487 A1 * | 8/2012 | Tanaka | C02F 9/00 47/60 |
| 2015/0223491 A1 * | 8/2015 | Frampton | A01G 31/042 700/283 |
| 2015/0250115 A1 * | 9/2015 | Pickell | A01G 31/042 47/62 R |
| 2016/0302369 A1 * | 10/2016 | Pickell | A01G 31/045 |
| 2016/0316646 A1 * | 11/2016 | Lepp | A01G 31/06 |
| 2017/0035002 A1 * | 2/2017 | Ellins | A01G 31/02 |
| 2017/0354100 A1 | 12/2017 | Snyder | |

* cited by examiner

SYSTEMS AND METHODS FOR MEASURING WATER USAGE IN AN ASSEMBLY LINE GROW POD

CROSS REFERENCE TO RELATED APPLICATIONS

This application claims the benefit of U.S. Provisional Application Ser. No. 62/519,405 filed Jun. 14, 2017 and entitled "Systems and Methods for Measuring Water Usage in an Assembly Line Grow Pod" and U.S. Provisional Application Ser. No. 62/519,410 filed Jun. 14, 2017 and entitled "Systems and Methods for Reclaiming Water in an Assembly Line Grow Pod," the contents of which are hereby incorporated by reference in their entirety.

TECHNICAL FIELD

Embodiments described herein generally relate to systems and methods for measuring an amount of water that is being used in an assembly line grow pod.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food.

Controlled environment growing systems may mitigate the factors affecting harvest. In these controlled environment growing systems, water may be utilized for a variety of functions. Water usage generally increases operation costs of the controlled environment growing systems, and excessive water usage may inhibit the utilization of a controlled environment growing system in some areas, such as in dry, arid climates. Accordingly a need exists for systems to monitor and optimize water usage in a controlled environment growing system.

SUMMARY

In one embodiment, an assembly line grow pod includes a track extending between a growing region and a sanitizing region, a cart movably engaged with the track, a sanitizer system that applies a sanitizer solution to the cart at the sanitizing region, the sanitizer system including a gray solution tank for storing sanitizer solution runoff collected from the sanitizing region, a watering system that provides water to plant matter on the cart at the growing region, the watering system including an untreated water tank for storing water runoff collected from the growing region, and a flowmeter fluidly coupled to at least one of the sanitizer system and the watering system.

In another embodiment, a method for growing plant matter within an assembly line grow pod includes moving a cart carrying plant matter along a track, dispensing water to the plant matter on the cart, collecting water runoff from the dispensing of the water to the plant matter, moving the collected water runoff to an untreated water tank, moving the cart to a sanitizer device of the assembly line grow pod, dispensing a sanitizer solution to the cart with the sanitizer device, collecting sanitizer solution runoff from the dispensing of the sanitizer solution to the cart, moving the collected sanitizer solution runoff to a gray solution tank, and measuring at least one of a flow rate of the sanitizer solution dispensed to the cart and a flow rate of the collected sanitizer solution runoff moved to the gray solution tank.

In yet another embodiment, a method for growing plant matter within an assembly line grow pod includes dispensing water to plant matter on a cart, collecting water runoff from the dispensing of the water to the plant matter, filtering the collected water runoff and storing the filtered water in a treated water tank, dispensing a sanitizer solution to the cart, collecting sanitizer solution runoff from the dispensing of the sanitizer solution to the cart, filtering the sanitizer solution runoff and storing the filtered sanitizer solution in a cycled solution tank, measuring a flow rate of water dispensed to the plant matter, and measuring a flow rate of sanitizer solution dispensed to the cart.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for measuring an amount of water that is used by various portions of an assembly line grow pod. In embodiments, carts holding plant matter are supported on a track extending between a growing region and a sanitizing region. The assembly line grow pod may include a watering system that provides water and/or nutrients to plant matter within the carts. After the plants are harvested or disposed, a sanitizing system may wash the carts for reuse in the assembly line grow pod. Water that is used to wash the carts and/or to water the plant matter may be captured and reused to minimize the amount of wastewater that is generated by the assembly line grow pod and to minimize the supply of fresh water required to operate the assembly line grow pod. To ensure that water is available for the washing process and to ensure that only a certain amount of new water is utilized for each washing process, it is desirable to monitor the water that is being used within the assembly line grow pod. Systems and methods for managing water usage in an assembly line grow pod are described in greater detail herein.

In some embodiments, the assembly line grow pod may be a "zero waste" facility that does not generate wastewater, and instead re-uses water in growing and sanitizing processes. By accomplishing growing and sanitizing processes without the generation of wastewater, assembly line grow pods as described herein may have a comparatively low environmental impact as compared to conventional controlled environment growing systems. Furthermore, by re-using water in growing and sanitizing processes, the amount of water consumed by the assembly line grow pod (e.g., the amount of outside water required by the assembly line grow pod) may be minimized, which may be particularly desirable in dry and arid climates.

As used herein, the term "plant matter" may encompass any type of plant and/or seed material at any stage of growth, for example and without limitation, seeds, germinating seeds, vegetative plants, and plants at a reproductive stage.

Figure 1:
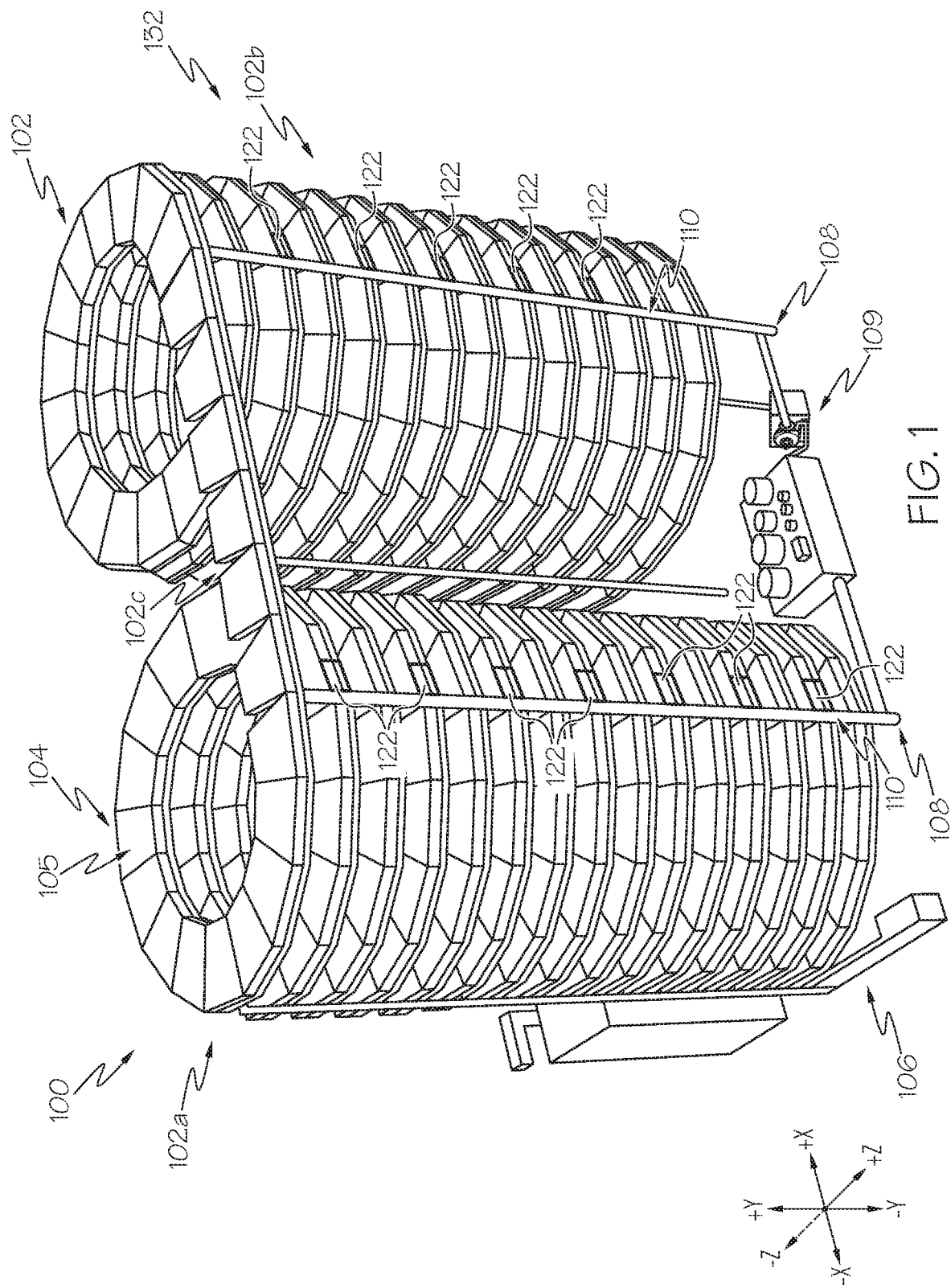
FIG. 1 schematically depicts an assembly line grow pod, according to one or more embodiments shown and described herein.

Referring initially to FIG. 1, a front perspective view of an assembly line grow pod 100 is depicted. The assembly line grow pod 100 includes a track 102 that is configured to allow one or more carts 104 to travel along the track 102. In the embodiment depicted in FIG. 1, the assembly line grow pod 100 includes an ascending portion 102a, a descending portion 102b, and a connection portion 102c. The track 102 at the ascending portion 102a moves upward in a vertical direction (e.g., in the +y-direction as depicted in the coordinate axes of FIG. 1), such that carts 104 moving along the track 102 move upward in the vertical direction as they travel along the ascending portion 102a. The track 102 at the ascending portion 102a may include curvature as depicted in FIG. 1, and may wrap around a first axis that is generally parallel to the y-axis depicted in the coordinate axes of FIG. 1, forming a spiral shape around the first axis. The connection portion 102c is positioned between the ascending portion 102a and the descending portion 102b, and may be relatively level as compared to the ascending portion 102a and the descending portion 102b, such that the track 102 generally does not move upward or downward in the vertical direction at the connection portion 102c. The track 102 at the descending portion 102b moves downward in the vertical direction (e.g., in the −y-direction as depicted in the coordinate axes of FIG. 1), such that carts 104 moving along the track 102 move downward in the vertical direction as they travel along descending portion 102b. The track 102 at the descending portion 102b may be curved, and may wrap around a second axis that is generally parallel to the y-axis depicted in the coordinate axes of FIG. 1, forming a spiral shape around the second axis. In some embodiments, such as the embodiment shown in FIG. 1, the ascending portion 102a and the descending portion 102b may generally form symmetric shapes and may be mirror-images of one another. In other embodiments, the ascending portion 102a and the descending portion 102b may include different shapes that ascend and descend in the vertical direction, respectively. The ascending portion 102a and the descending portion 102b may allow the track 102 to extend a relatively long distance while occupying a comparatively small footprint evaluated in the x-direction and the z-direction as depicted in the coordinate axes of FIG. 1, as compared to assembly line grow pods that do not include an ascending portion 102a and a descending portion 102b. Minimizing the footprint of the assembly line grow pod 100 may be advantageous in certain applications, such as when the assembly line grow pod 100 is positioned in a crowded urban center or in other locations in which space is limited.

In the embodiment depicted in FIG. 1, the carts 104 of the assembly line grow pod 100 include trays 105 for holding plant matter. In operation, the trays 105 of the carts 104 are loaded with plant matter, such as through a seeding process. The plant matter is then grown within the carts 104 as the carts 104 move along the track 102 in a growing region 132 of the assembly line grow pod 100. For example, after plant matter is deposited within the carts 104, the carts 104 move up the track 102 on the ascending portion 102a, across the connection portion 102c, and down the track 102 on the descending portion 102b. As the carts 104 move along the track 102, the plant matter within the trays 105 of the carts 104 grow and develop. After moving down the track 102 at the descending portion 102b, the plant matter within the carts 104 may be harvested. In some instances, the plant matter within the carts 104 may not be ready for harvest after moving down the descending portion 102b. In these instances, the carts 104 may proceed to take another lap up the track 102 of the ascending portion 102a, across the connection portion 102c, and down the track 102 of the descending portion 102b.

Figure 2:
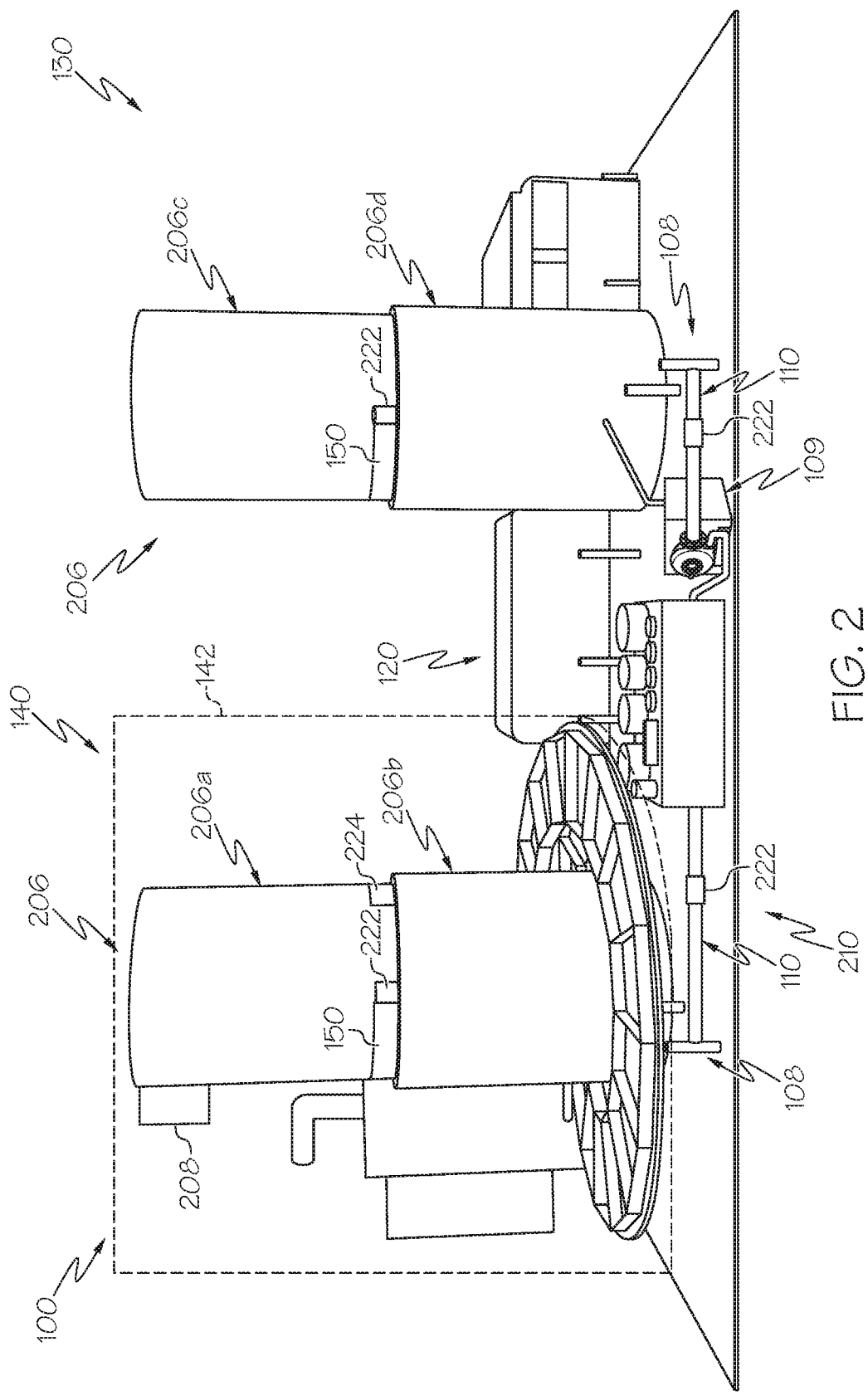
FIG. 2 schematically depicts a watering system and a sanitizing system of the assembly line grow pod of FIG. 1, according to one or more embodiments shown and described herein.

Referring collectively to FIGS. 1 and 2, the assembly line grow pod 100 includes a watering system 130 and a sanitizing system 140. The sanitizing system 140 includes a sanitizer device 120, a cycled solution tank 206a, a gray solution tank 206b, and one or more water lines 110 fluidly coupling the sanitizer device 120, the gray solution tank 206b, and the cycled solution tank 206a to one another. The sanitizing system 140 generally defines a sanitizing region 142 of the assembly line grow pod 100, and the assembly line grow pod 100. The growing region 132 of the assembly line grow pod 100 generally includes areas of the assembly line grow pod 100 positioned outside of the sanitizing region 142.

After harvesting, the carts 104 enter the sanitizing region 142 of the assembly line grow pod 100. Once plant matter within the trays 105 of the carts 104 has been harvested, such as by a harvesting device or the like, the carts 104 enter the sanitizer device 120, which removes plant matter and particulate that may remain on the cart 104 from harvesting. The sanitizer device 120 may include any of a number of different washing mechanisms to apply water and/or a sanitizer solution to the carts 104, and may apply high pressure water, high temperature water, and/or other solutions for cleaning the cart 104 and/or tray 105.

Figure 3:
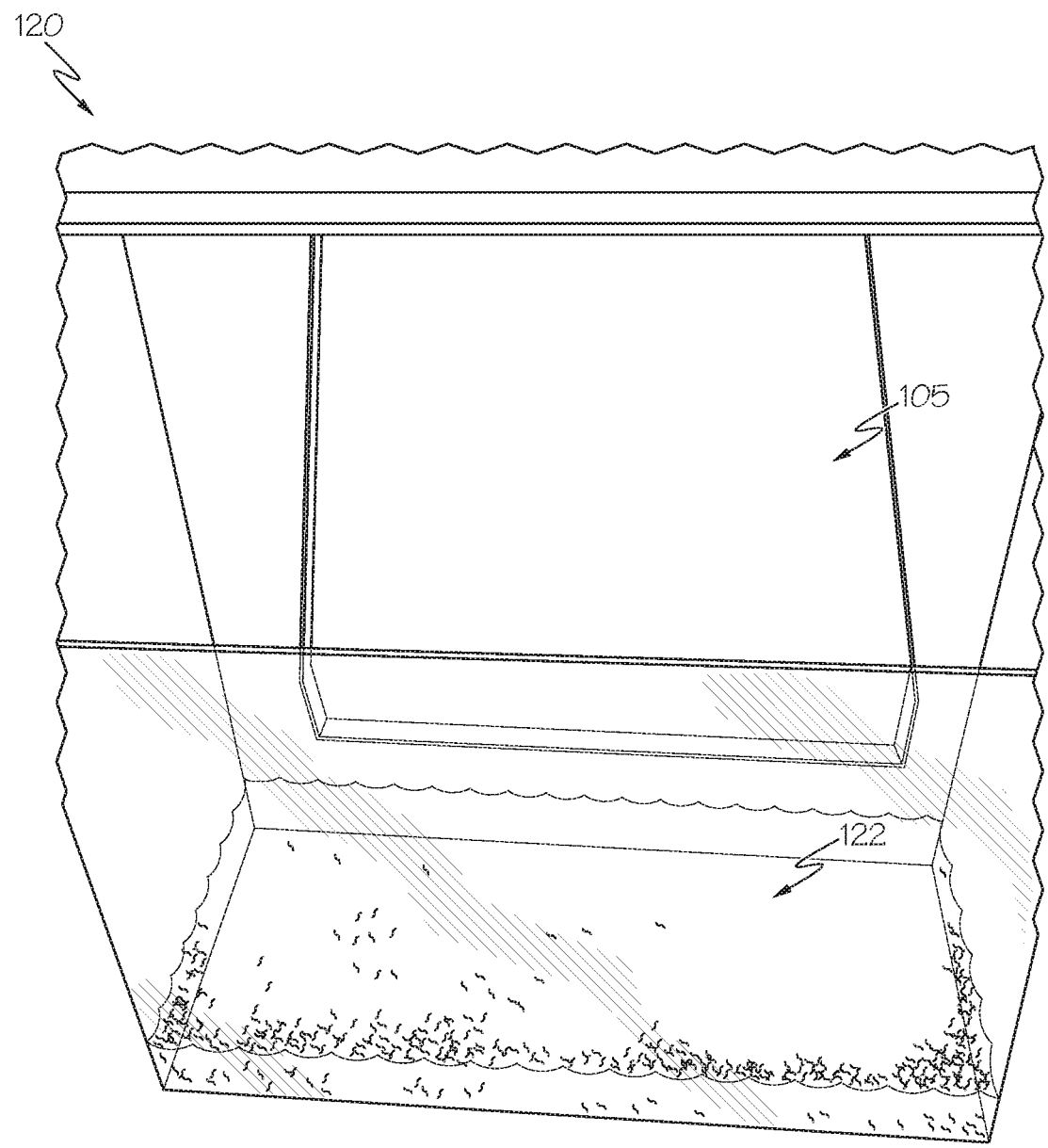
FIG. 3 schematically depicts a drainage trough of the assembly line grow pod of FIG. 1, according to one or more embodiments shown and described herein.

Referring collectively to FIGS. 2 and 3, the sanitizing region 142 may include one or more drainage troughs 122 positioned within the sanitizing region 142. In embodiments, the one or more drainage troughs 122 may be positioned within the sanitizer device 120. As the sanitizer device 120 applies water and/or a sanitizer solution to the trays 105 of the carts 104, sanitizer solution runoff may be re-captured in the drainage trough 122. The drainage trough 122 is fluidly coupled to the gray solution tank 206b, such as through the one or more water lines 110.

Referring particularly to FIG. 2, the sanitizing system 140 generally includes the cycled solution tank 206a and the gray solution tank 206b fluidly coupled to the cycled solution tank 206a. The cycled solution tank 206a is a holding tank that generally holds sanitizer solution that is ready to be utilized by the sanitizer device 120, and the gray solution tank 206b is a holding tank that generally holds gray solution that has been utilized by the sanitizer device 120, such as gray solution collected by the drainage trough 122 (FIG. 3). Gray solution may be sanitizer solution that has been used to wash the trays 105 and therefore may contain traces of dirt, grease, plant tissue, chemicals used by the sanitizer device 120, or the like.

A filter 150 is positioned between the gray solution tank 206b and the cycled solution tank 206a and is fluidly coupled to the gray solution tank 206b and the cycled solution tank 206a. The filter 150 is configured to filter and/or apply a treatment to sanitizer solution passing through the filter 150. For example the filter 150 may apply chemical treatment, UV treatment, reverse osmosis heating, cooling, or the like, to remove contaminants in the sanitizer solution, such as plant matter, particulate matter, and/or chemicals from the sanitizer device 120. Upon moving through the filter 150, sanitizer solution from the gray solution tank 206b moves into the cycled solution tank 206a for use in additional cleaning processes within the sanitizer device 120. In this way sanitizer solution in the sanitizing system 140 may be reused.

In the embodiment depicted in FIG. 2, the sanitizer system 110 further comprises a sanitizer reservoir 208 fluidly coupled to the cycled solution tank 206a, and a concentration sensor 224 positioned on the cycled solution tank 206a. The sanitizer reservoir 208 may hold a concentrated sanitizer configured to be mixed with water to form sanitizer solution. For example and without limitation, the sanitizer may include acid, wetting agents, foaming agents and the like, and may be configured to be mixed with water at a preferred concentration. In embodiments, sanitizer from the sanitizer reservoir 208 may be dispensed to the sanitizer solution within the cycled solution tank 206a to maintain a preferred concentration of the sanitizer within the sanitizer solution. The concentration sensor 224 positioned on the cycled solution tank 206a is configured to detect the concentration of sanitizer within the sanitizer solution in the cycled solution tank 206a.

Referring again to FIGS. 1 and 2, the watering system 130 includes the untreated water tank 206d, the treated water tank 206c, and one or more drainage troughs 122 positioned on the track 102. The one or more water lines 110 extend up the ascending portion 102a and the descending portion 102b (e.g., generally in the +/−y-direction of the coordinate axes of FIG. 1) to distribute water and nutrients to plant matter within carts 104 on the track 102. In embodiments, the one or more water lines 110 distribute water and/or nutrients to carts 104 at predetermined areas of the growing region 132 of the assembly line grow pod 100. As the watering system 130 applies water and/or a nutrient solution to plant matter on the carts 104 on the track 102, water runoff may be re-captured in the drainage troughs 122. The drainage troughs 122 of the watering system 130 are fluidly coupled to the untreated water tank 206d, such as through the one or more water lines 110.

The untreated water tank 206d the treated water tank 206c fluidly coupled to one another. The untreated water tank 206d may be a holding tank that holds untreated water and the treated water tank 206c may be a holding tank that holds treated water. Untreated water may generally be water that has run off from the trays 105 throughout the growing region 132 of the assembly line grow pod 100, has been collected and transferred to the untreated water tank 206d. That is, the untreated water may be water that has been dispensed to a tray 105, but has runoff from the tray 105, such as due to overfilling, misalignment with a water source connected to the water line 110, or the like. As such, the untreated water may be generally clean water, but may also contain particles therein from plant matter, dust from metal-on-metal contact between portions of the cart 104 (e.g., the wheels of the cart 104) and the track 102 (FIG. 1).

A filter 150 is positioned between the treated water tank 206c and the untreated water tank 206d and is fluidly coupled to the treated water tank 206c and the untreated water tank 206d. The filter 150 is configured to filter and/or apply a treatment to water passing through the filter 150 (e.g., chemical treatment, UV treatment, reverse osmosis heating, cooling, etc.) to remove contaminants in the water, such as plant matter, particulate matter. Upon moving through the filter 150, water from untreated water tank 206d to treated water tank 206c for use in the assembly line grow pod 100. In this way, water in the watering system 130 may be reused. In embodiments, the treated water tank 206c and/or the untreated water tank 206d may additionally be fluidly coupled to an outside water source, such as a water main, a cistern, a well, or the like to provide fresh water to the watering system 130.

The treated water tank 206c may additionally be fluidly coupled to the cycled solution tank 206a to provide additional water to the sanitizing system 140, as will be described in greater detail herein. For example, the sanitizer system 140 may lose sanitizer solution over time, such as by evaporation, spillage or the like. Accordingly, it may be desirable to periodically provide fresh water to the sanitizer system 140, which may be provided from the treated water tank 206c. In embodiments, the sanitizer within the sanitizer solution may generally prohibit the use of sanitizer solution within the watering system 130 (e.g., the sanitizer may generally be unsuitable for application to plant matter), however, fresh water from the watering system 130 may act to supplement lost sanitizer solution in the sanitizer system 140. In other embodiments, a filter may remove sanitizer from the sanitizer solution such that sanitizer solution from the sanitizer system 140 may be filtered to supplement lost water from the watering system 130.

Referring to FIG. 2, each of the watering system 130 and the sanitizing system 140 include the one or more water lines 110, one or more valves 108, and one or more pumps 109, drainage troughs 122, and a water usage monitoring system 210. Each one of the one or more valves 108 may be configured to direct water to different locations in the assembly line grow pod 100, and the one or more pumps 109 may provide pressure to move water and/or sanitizer solution throughout the watering system 130 and the sanitizing system 140, respectively. While FIG. 2 depicts the various valves 108, pumps 109, and water lines 110 as being located in a particular location within the assembly line grow pod 100, such location are merely illustrative. Each one of the one or more valves 108, pumps 109, and water lines 110 may be located at any location within the assembly line grow pod 100, particularly locations that are fluidly coupled between a fluid source (e.g., the tanks 206a-d) and a fluid distribution point (e.g., the sanitizer device 120, etc.). In some embodiments, a single valve 108, a single pump 109, and/or a single water line 110 may be located between a fluid source and a fluid distribution point. In other embodiments, a plurality of valves 108, pumps 109, and/or water lines 110 may be located between the fluid source and the fluid distribution point for the purposes of allowing fluid to be redirected on the fly as needed, to allow the fluid to pressurize, to ensure a balance of fluid, and/or the like.

The assembly line grow pod 100 includes the water usage monitoring system 210 fluidly coupled to the sanitizing system 140 and the watering system 130. The water usage monitoring system 210 generally includes one or more flowmeters 222 be fluidly coupled between the various portions of the sanitizing system 140 and the watering system 130. For example, in the embodiment depicted in FIG. 2, the water usage monitoring system 210 includes a flowmeter 222 fluidly coupled to and positioned between the gray solution tank 206*b* and the cycled solution tank 206*a*, and a flowmeter 222 fluidly coupled to and positioned between the untreated water tank 206*d* and the treated water tank 206*c*. The water usage monitoring system 210 may further include flowmeters 222 positioned on the one or more water lines 110 between the drainage troughs 122 of the sanitizing system 140 (FIG. 3) and the gray solution tank 206*b*, and between the drainage troughs 122 of the watering system 130 (FIG. 1) and the untreated water tank 206*d*. The flowmeters 222 may include any suitable flowmeter device for measuring a flow rate, and may include a positive displacement flowmeter, a rotatameter, an electromagnetic flowmeter, an ultrasonic flowmeter, or the like.

For example, in some embodiments, the flowmeters 222 may each include an input and an output and one or more measuring devices positioned between the input and output for detecting the flow of fluid through the flowmeter. As one example, when the flowmeters 222 include a rotatameter, the flowmeters 222 may include a float positioned between the inlet and the outlet, and a position of the float between the inlet and the outlet may be indicative of the flow rate of fluid through the flowmeter 222. In other embodiments, such as when the flowmeter comprises an ultrasonic flowmeter, the flowmeters 222 may include one or more ultrasonic devices that are configured to emit ultrasonic energy and may determine a flow rate of fluid based on the reflection of the emitted ultrasonic energy.

The information can be used by the water usage monitoring system 210 (particularly the flowmeters 222) to determine whether an excessive amount of water is being used, to determine steps for increasing or decreasing water usage, to control various components in a particular manner based on the amount of water usage, and/or the like, as described in greater detail herein. In some embodiments, a water usage monitoring system 210 may determine an amount of water used in a particular one of the tanks 206*a-d* (FIG. 2). The data obtained from the water usage monitoring system 210 may then be used to estimate an amount of water or sanitizer solution that should be present in the ones of the tanks 206*a-d* (FIG. 2) by analyzing historical data relating to those particular tanks 206*a-d*. That is, if the water usage monitoring system 210 determines that a first tank has a water volume of X and historically, when the first tank has had a water volume of X, a second tank coupled to the first tank has a corresponding water volume of Y. Therefore, it may be estimated that the second tank has a water volume of Y without actually measuring the volume of the water held by the second tank. This estimation may then be used in conjunction with an actual determination of the volume of the second tank to ensure that it is holding the expected amount of water therein.

Referring again to FIG. 1, the assembly line grow pod 100 includes a master controller 106. The master controller 106 may include various components that control particular portions of the assembly line grow pod 100. For example, the master controller 106 may contain components for controlling various environmental conditions within the assembly line grow pod 100, such as light, temperature, humidity, and/or the like. In another example, the master controller 106 may contain components for controlling fluid flow throughout the assembly line grow pod, such as components that control the valves 108 (FIG. 2), the pumps 109 (FIG. 1), and/or the like to direct fluid to/from the tanks 206*a-d* and the sanitizer device 120 (FIG. 2), as described herein.

For example, the master controller 106 is communicatively coupled to the one or more valves 108 and may include a valve control module that provides control signals to one or more valves 108 and/or receive status signals from the one or more valves 108. As a result of this providing and receiving of signals, the valve control module can effectively direct the one or more valves 108 to direct fluid to any locations within the assembly line grow pod 100. For example, certain ones of the one or more valves 108 may be fluidly coupled to one or more water lines 110 and the treated water tank 206*c* (FIG. 2), and may direct water to carts 104 on the track 102. Others of the one or more valves 108 may be fluidly connected to the one or more water lines 110 and the cycled solution tank 206*a* (FIG. 2), and may direct water and/or a sanitizer solution to the sanitizer device 120 (FIG. 2).

In another example, the master controller 106 is communicatively coupled to the one or more pumps 109 and may include a pump control module that provides control signals to one or more pumps 109 and/or receive status signals from the one or more pumps 109. As a result of this providing and receiving of signals, the pump control module can effectively direct the one or more pumps 109 to pump fluid through the one or more water lines 110.

In yet another example, the master controller 106 is communicatively coupled to the sanitizer reservoir 208 and/or the concentration sensor 224. The master controller 106 may include a sanitizer concentration control module that provides control signals to the sanitizer reservoir 208 and/or receives status signals from the concentration sensor 224. As a result of this providing and receiving of signals, the sanitizer concentration control module can effectively direct the sanitizer reservoir 208 to release additional sanitizer into the cycled solution tank 206*a* in response to a status signal from the concentration sensor 224.

Figure 4:
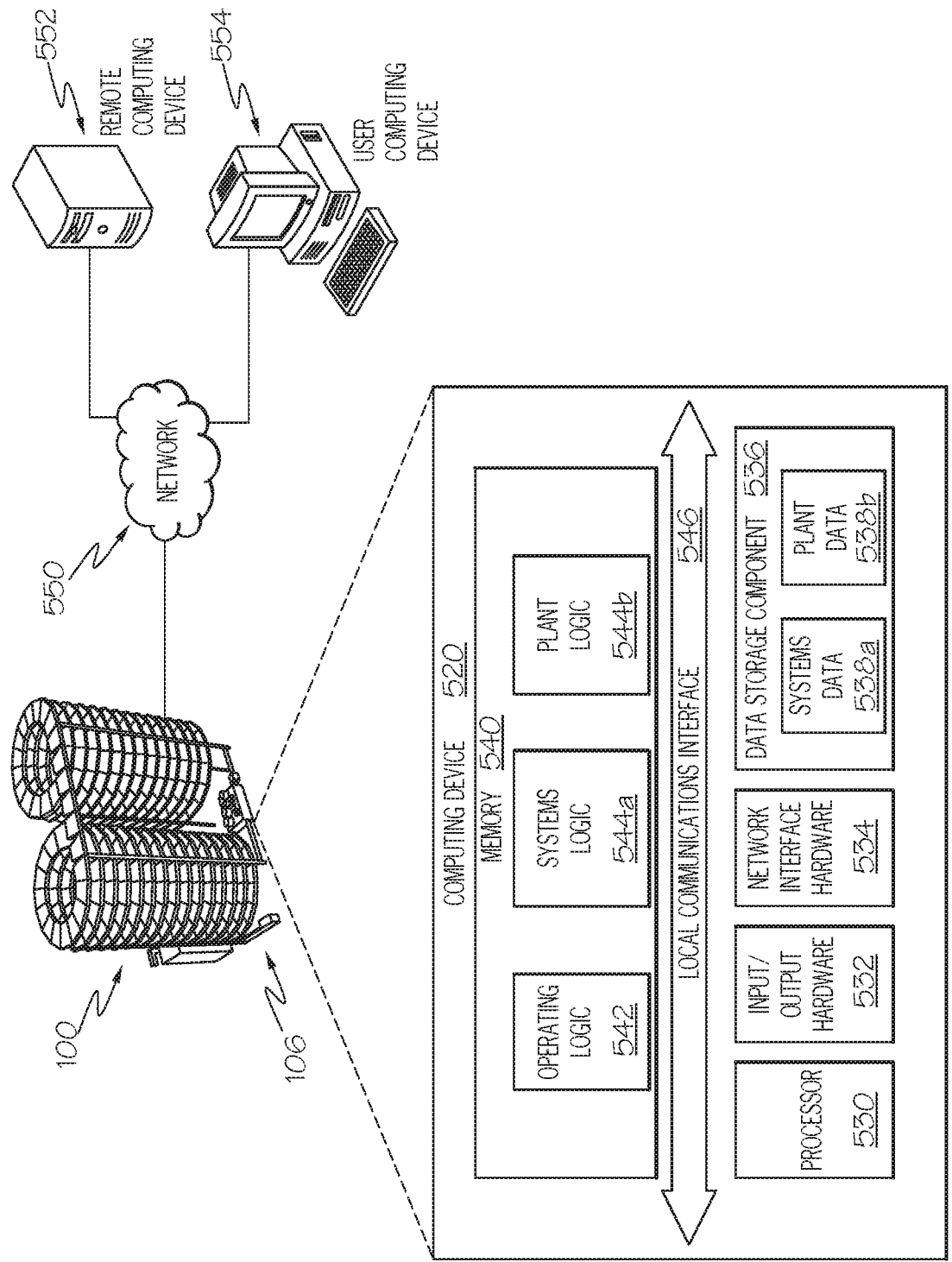
FIG. 4 schematically depicts an illustrative computing environment of the assembly line grow pod of FIG. 1, according to one or more embodiments shown and described herein.

Referring now to FIG. 4, the master controller 106 may include a computing device 520. The computing device 520 includes a processor 530, input/output hardware 532, the network interface hardware 534, a data storage component 536 (which stores systems data 538*a*, plant data 538*b*, and/or other data), and the memory component 540. The memory component 540 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the computing device 520 and/or external to the computing device 520.

The memory component 540 may store operating logic 542, the systems logic 544a, and the plant logic 544b. The systems logic 544a and the plant logic 544b may each include a plurality of different pieces of logic, each of which may be embodied as a computer program, firmware, and/or hardware, as an example. The systems logic 544a may monitor and control operations of one or more of the valves 108 (FIG. 2), the pumps 109 (FIG. 2), and/or the like, as well as control operation of the tanks 206a-d (FIG. 2), including any filtering and treatment of the water within the various tanks. The plant logic 544b may be configured to determine and/or receive a recipe for plant growth and may facilitate implementation of the recipe via the systems logic 544a.

The operating logic 542 may include an operating system and/or other software for managing components of the computing device 520. As also discussed above, systems logic 544a and the plant logic 544b may reside in the memory component 540 and may be configured to perform the functionality, as described herein.

It should be understood that while the components in FIG. 4 are illustrated as residing within the computing device 520, this is merely an example. In some embodiments, one or more of the components may reside external to the computing device 520. It should also be understood that, while the computing device 520 is illustrated as a single device, this is also merely an example. In some embodiments, the systems logic 544a and the plant logic 544b may reside on different computing devices. As an example, one or more of the functionalities and/or components described herein may be provided by a user computing device and/or a remote computing device.

Additionally, while the computing device 520 is illustrated with the systems logic 544a and the plant logic 544b as separate logical components, this is also an example. In some embodiments, a single piece of logic (and/or or several linked modules) may cause the computing device 520 to provide the described functionality.

A local interface 546 is also included in FIG. 4 and may be implemented as a bus or other communication interface to facilitate communication among the components of the computing device 520. The processor 530 may include any processing component operable to receive and execute instructions (such as from a data storage component 536 and/or the memory component 540). The input/output hardware 532 may include and/or be configured to interface with microphones, speakers, a display, and/or other hardware.

The network interface hardware 534 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the computing device 520 and other devices external to the computing device.

Additionally, the assembly line grow pod 100 is coupled to a network 550. The network 550 may include the internet or other wide area network, a local network, such as a local area network, a near field network, such as Bluetooth or a near field communication (NFC) network. The network 550 is also coupled to a user computing device 552 and/or a remote computing device 554. The user computing device 552 may include a personal computer, laptop, mobile device, tablet, server, etc. and may be utilized as an interface with a user. As an example, a user may send a recipe to the computing device 520 for implementation by the assembly line grow pod 100. Another example may include the assembly line grow pod 100 sending notifications to a user of the user computing device 552.

Similarly, the remote computing device 554 may include a server, personal computer, tablet, mobile device, etc. and may be utilized for machine to machine communications. As an example, if the assembly line grow pod 100 determines a type of seed being used (and/or other information, such as ambient conditions), the computing device 520 may communicate with the remote computing device 554 to retrieve a previously stored recipe for those conditions. As such, some embodiments may utilize an application program interface (API) to facilitate this or other computer-to-computer communications.

As described above, the watering system 130 and the sanitizing system 140 include tanks 206a-d and drainage troughs 122 for storing and recapturing dispensed water and sanitizer solution. Methods for managing water flow within the watering system 130 and the sanitizing system 140 will now be described with reference to the appended figures.

Figure 5:
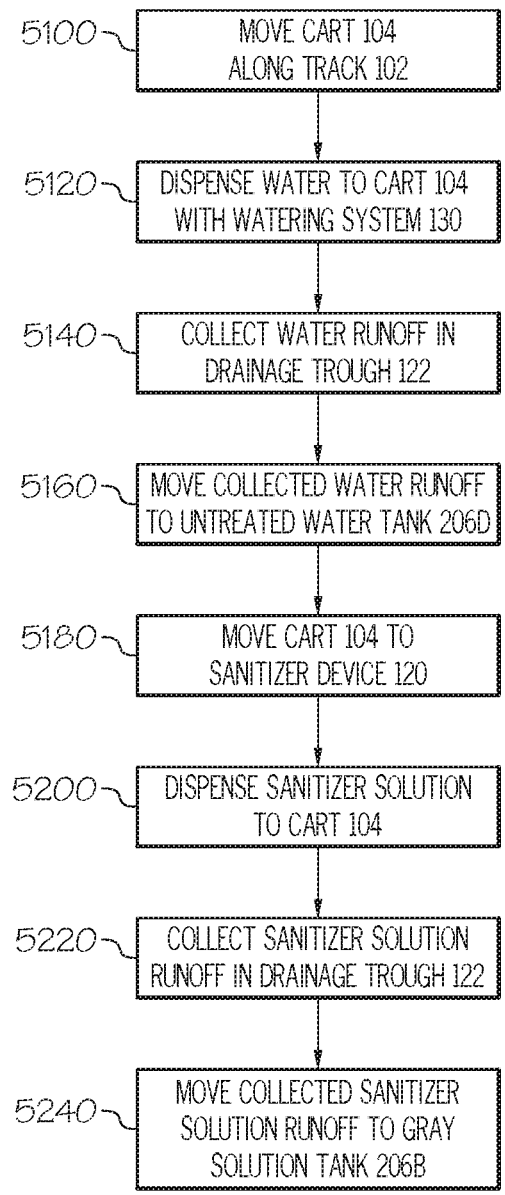
FIG. 5 schematically depicts a flow diagram of an illustrative method for dispensing water and collecting water runoff in an assembly line grow pod, according to one or more embodiments shown and described herein.

Referring collectively to FIGS. 1, 2, and 5, an example method for growing plant matter within an assembly line grow pod 100 is depicted. In a first block 5100, the cart 104 is moved along the track 102. For example, the cart 104 may be loaded with plant matter and moved along the track 102 through the growing region 132 of the assembly line grow pod 100. At block 5120, water is dispensed to the cart 104 by the watering system 130. For example, treated water from the treated water tank 206c is pumped through the one or more water lines 110 to the cart 104 to dispense the water to the cart 104. At block 5140, water runoff from block 5120 is collected in drainage troughs 122. As described above, the water runoff may result from the dispensing of the water to the cart 104. At block 5160, the collected water runoff is moved from the drainage troughs 122 to the untreated water tank 206d.

At block 5180, the cart 104 is moved along the track 102 to the sanitizer device 120. As described above, the cart 104 may be moved to the sanitizer device 120 after harvesting of plant matter positioned within the cart 104. The sanitizer device 120 may apply sanitizer solution to the carts 104 at block 5200. As described above, the sanitizer solution may assist in removing any remaining plant matter from the carts to clean the carts 104 for reuse in the assembly line grow pod 100. At block 5220, sanitizer solution runoff from block 5200 is collected in the drainage trough 122 positioned within the sanitizer device 120. At block 5240, the collected sanitizer solution runoff is moved from the drainage trough 122 to the gray solution tank 206b.

As described above, water and/or sanitizer solution may be moved, such as between the treated water tank 206c and the carts 104, between the drainage troughs 122 and the untreated water tank 206d, between the cycled solution tank 206a and the sanitizer device 120, and between the drainage trough 122 and the gray solution tank 206b via the pumps 109 and the one or more water lines 110. Additionally, the blocks described above may be directed by the master controller 106, such as by directing one or more of the valves 108 and the pumps 109 to selectively direct water and/or sanitizer solution as described above. While blocks 5100-5240 are described and depicted as being performed in a sequential order, it should be understood that any of blocks 5100 may be performed in any suitable order and may be performed simultaneously on different carts 104 throughout the assembly line grow pod 100.

Figure 6:
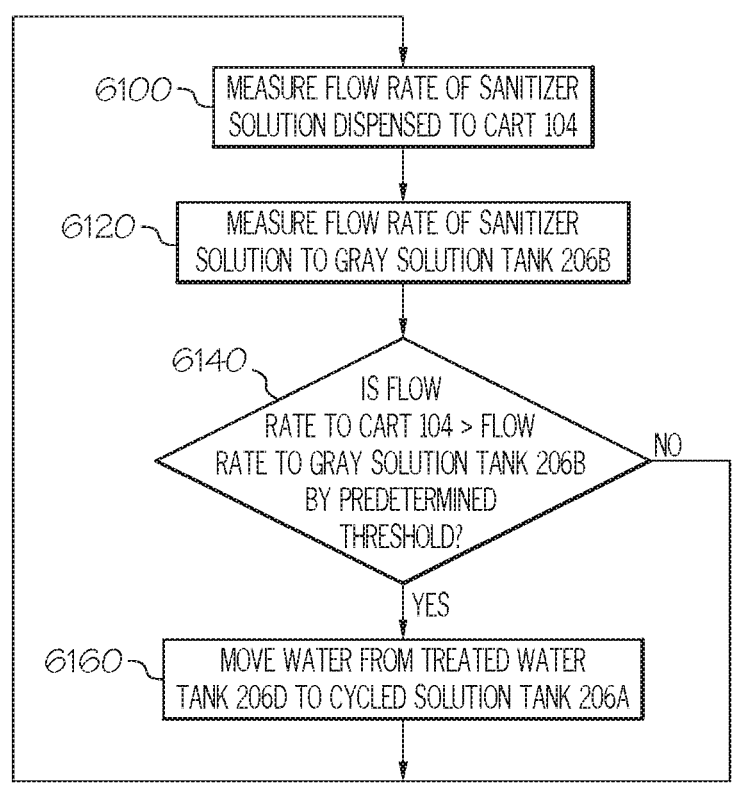
FIG. 6 schematically depicts a flow diagram of an illustrative method of managing water in an assembly line grow pod based on a detected flow rate, according to one or more embodiments shown and described herein.

Referring to FIGS. 1, 2, and 6, an example method for managing water usage in the assembly line grow pod 100 is depicted. In a first block 6108, a flow rate of sanitizer solution dispensed to a cart 104 is measured. For example, the flow rate of the sanitizer solution may be measured by a flowmeter 222, such as a flowmeter 222 positioned between the cycled solution tank 206a and the sanitizer device 120. At block 6120, the flow rate of sanitizer solution being moved to the gray solution tank 206b is measured. For example, the flow rate of the sanitizer solution may be measured by a flowmeter 222 positioned between the drainage trough 122 and the gray solution tank 206b to measure the flow rate of sanitizer solution runoff being moved the gray solution tank 206b. At block 6160, if the measured flow rate of sanitizer solution to the cart 104 exceeds the measured flow rate of sanitizer solution being moved to the gray solution tank 206b by more than a predetermined threshold, them at block 6160, water is moved from the treated water tank 206c to the cycled solution tank 206a. If the measured flow rate of sanitizer solution being dispensed to the carts 104 does not exceed the measured flow rate of sanitizer solution being moved to the gray solution tank 206b by the predetermined threshold, then the system (e.g., the master controller 106) returns to block 6100.

As described above, sanitizer solution is applied to the carts 104 by the sanitizer device 120, and sanitizer solution runoff from the sanitizer device 120 is collected and returned to the gray solution tank 206b. In this way, much or most of the sanitizer solution used by the sanitizer device 120 may be reused. However, if the flow rate of sanitizer solution being applied to the carts 104 exceeds the flow rate of sanitizer solution runoff being returned to the gray solution tank 206b (e.g., because of loss of sanitizer solution due to evaporation, spillage, or the like), it may be necessary to provide additional water to the sanitizer system 140. Additional water may be provided to the sanitizer system 140 by moving water from the treated water tank 206c of the watering system 130 to the cycled solution tank 206a. In this way, by measuring the flow rate of sanitizer solution applied to the carts 104 and the flow rate of collected sanitizer solution runoff that is being moved back to the gray solution tank 206b, water may be added to the sanitizer system 140 to ensure that sanitizer solution is available to apply to the carts 104.

The blocks described above may be directed by the master controller 106, such as by directing one or more of the valves 108 and the pumps 109 to selectively direct water from the treated water tank 206c to the cycled solution tank 206a, as described above. Additionally, the method depicted in FIG. 6 may be utilized simultaneously with other methods for managing water in the assembly line grow pod 100, for example, the method described above with respect to FIG. 5.

In embodiments, the predetermined threshold may be selected to be any appropriate value to ensure that the cycled solution tank 206a does not run out of sanitizer solution to apply to the carts 104. In one example, the predetermined threshold may be that the measured flow rate of sanitizer solution to the carts 104 is twice (2×) the measured flow rate of sanitizer solution runoff being moved to the gray solution tank 206b. In one example, the predetermined threshold may be that the measured flow rate of sanitizer solution to the carts 104 is three times (3×) the measured flow rate of sanitizer solution runoff being moved to the gray solution tank 206b. In one example, the predetermined threshold may be that the measured flow rate of sanitizer solution to the carts 104 is five times (5×) the measured flow rate of sanitizer solution runoff being moved to the gray solution tank 206b.

Figure 7:
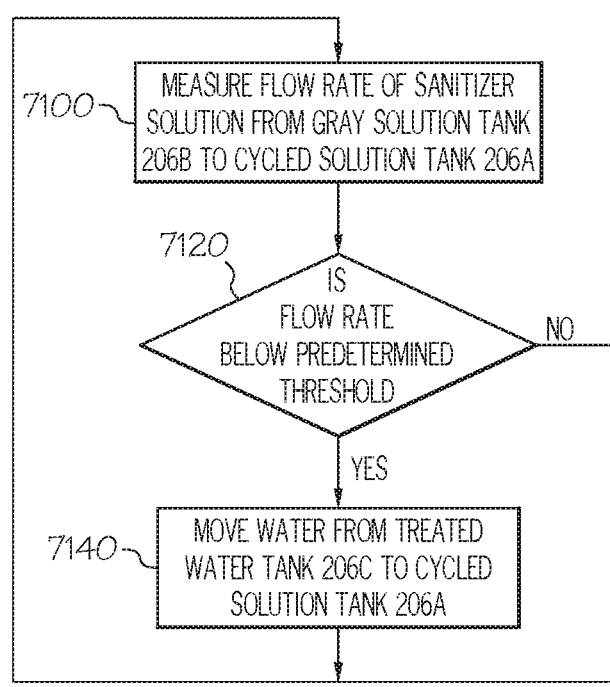
FIG. 7 schematically depicts a flow diagram of another illustrative method of managing water in an assembly line grow pod based on a detected flow rate, according to one or more embodiments shown and described herein.

Referring collectively to FIGS. 1, 2, and 7, the assembly line grow pod 100 an example method for managing water usage in the assembly line grow pod 100 is depicted. In a first block 7100, the flow rate of sanitizer solution being moved from the gray solution tank 206b being moved to the cycled solution tank 206a, such as through the filter 150, is measured. For example, the flow rate of the sanitizer solution may be measured by a flowmeter 222 positioned between the gray solution tank 206b and the cycled solution tank 206a. At block 7120, if the measured flow rate is below a predetermined threshold, then at block 7140, water is moved from the treated water tank 206c to the cycled solution tank 206a to ensure that there is sufficient water/sanitizer solution in the cycled solution tank 206a to apply sanitizer solution to the carts 104. If the measured flow rate is not below the predetermined threshold, then the system (e.g., the master controller 106) returns to block 7100.

The blocks described above may be directed by the master controller 106, such as by directing one or more of the valves 108 and the pumps 109 to selectively direct water from the treated water tank 206c to the cycled solution tank 206a, as described above. Additionally, the method depicted in FIG. 7 may be utilized simultaneously with other methods for managing water in the assembly line grow pod 100, for example the methods described above with respect to FIGS. 5 and 6.

In embodiments, the predetermined threshold may be selected to be any appropriate value to ensure that the cycled solution tank 206a does not run out of sanitizer solution to apply to the carts 104. In one example, the predetermined threshold may be any value greater than zero. In other embodiments, the predetermined value may be based on the measured flow rate of sanitizer solution being applied to the carts 104. For example, the predetermined value may be selected to match the flow rate of sanitizer solution being applied to the carts 104, such that water is moved from the treated water tank 206c to the cycled solution tank 206a if the flow rate of sanitizer solution being applied to the carts 104 exceeds the flow rate of sanitizer solution being moved from the gray solution tank 206b to the cycled solution tank 206a.

Figure 8:
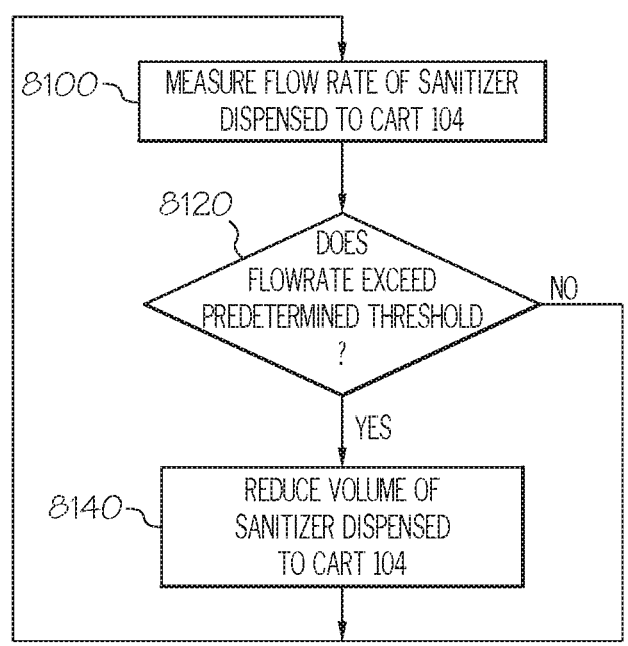
FIG. 8 schematically depicts a flow diagram of another illustrative method of managing water in an assembly line grow pod based on a detected flow rate, according to one or more embodiments shown and described herein.

Referring collectively to FIGS. 1, 2, and 8, the assembly line grow pod 100 an example method for managing water usage in the assembly line grow pod 100 is depicted. In a first block 8100, the flow rate of sanitizer solution being dispensed to the carts 104 by the sanitizer device 120 is measured. For example, the flow rate of the sanitizer solution may be measured by a flowmeter 222, such as a flowmeter 222 positioned between the cycled solution tank 206a and the sanitizer device 120. At block 8120, if the measured flow rate is above a predetermined threshold, then at block 8140, a volume of sanitizer solution dispensed to the carts 104 is reduced to ensure that there is sufficient water/sanitizer solution in the cycled solution tank 206a to apply sanitizer solution to the carts 104. If the measured flow rate is not below the predetermined threshold, then the system (e.g., the master controller 106) returns to block 8100.

The blocks described above may be directed by the master controller 106, such as by directing one or more of the valves 108 and the pumps 109 to selectively restrict sanitizer solution provided to the sanitizer device 120, as described above. Additionally, the method depicted in FIG. 8 may be utilized simultaneously with other methods for managing water in the assembly line grow pod 100, for example the methods described above with respect to FIGS. 5, 6, and 7.

In embodiments, the predetermined threshold may be selected to be any appropriate value to ensure that the cycled solution tank 206a does not run out of sanitizer solution to apply to the carts 104. In one example, the predetermined threshold may be any value greater than zero. In other embodiments, the predetermined value may be based on the measured flow rate of sanitizer solution being applied to the carts 104. For example, the predetermined value may be selected to match the flow rate of sanitizer solution being moved from the gray solution tank 206b to the cycled solution tank 206a, such that the volume of sanitizer solution being applied to the carts 104 is reduced if the flow rate of sanitizer solution being applied to the carts 104 exceeds the flow rate of sanitizer solution being moved from the gray solution tank 206b to the cycled solution tank 206a.

Figure 9:
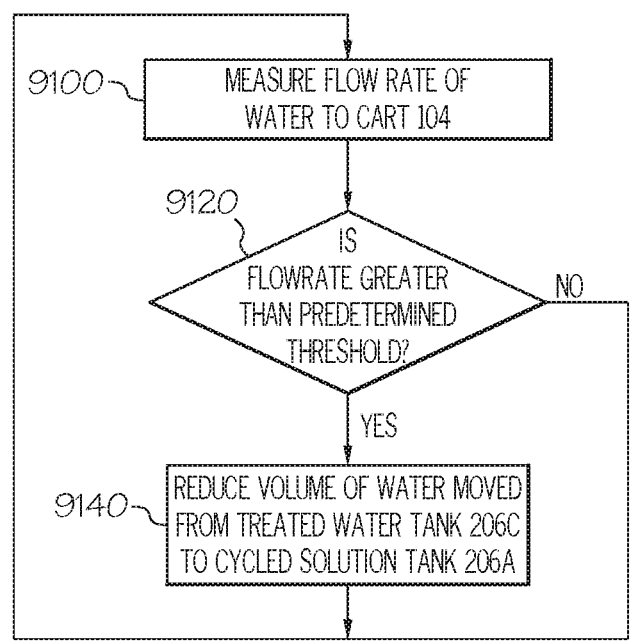
FIG. 9 schematically depicts a flow diagram of another illustrative method of managing water in an assembly line grow pod based on a detected flow rate, according to one or more embodiments shown and described herein.

Referring collectively to FIGS. 1, 2, and 9, the assembly line grow pod 100 an example method for managing water usage in the assembly line grow pod 100 is depicted. In a first block 9100, the flow rate of water being dispensed to the carts 104 by watering system 130 is measured. For example, the flow rate of the water provided to the carts may be measured by a flowmeter 222, such as a flowmeter 222 positioned between the treated water tank 206c the one or more water lines 110 extending along the track 102. At block 9120, if the measured flow rate is above a predetermined threshold, then at block 9140, then a volume of water being moved from the treated water tank 206c to the cycled solution tank 206a is reduced. As described above, water may be moved from the treated water tank 206c to supplement sanitizer solution that may be lost by the sanitizer system 140. However, if the flow rate of water being dispensed to the carts 104 by the watering system 130 exceeds a predetermined threshold (e.g., if the plant matter on the carts 104 require more water than a predetermined threshold), then it may be necessary to prioritize the availability of water within the watering system 130. Accordingly, if the measured flow rate of water being dispensed to the carts 104 exceeds the predetermined threshold, the system (e.g., the master controller 106) may reduce water being moved from the treated water tank 206c to the cycled solution tank 206a to reduce the amount of water leaving the watering system 130. If the measured flow rate is not below the predetermined threshold, then the system (e.g., the master controller 106) returns to block 9100.

The blocks described above may be directed by the master controller 106, such as by directing one or more of the valves 108 and the pumps 109 to selectively restrict water being moved between the treated water tank 206c and the cycled solution tank 206a, as described above. Additionally, the method depicted in FIG. 9 may be utilized simultaneously with other methods for managing water in the assembly line grow pod 100, for example, the methods described above with respect to FIGS. 5, 6, 7, and 8.

In embodiments, the predetermined threshold may be selected to be any appropriate value to ensure that the treated water tank 206c does not run out of water to apply to the carts 104. In one example, the predetermined threshold may be any value greater than zero. In other embodiments, the predetermined threshold may be based on other measured flow rates, such as the flow rate of water from drainage troughs 122 to the untreated water tank 102d.

Figure 10:
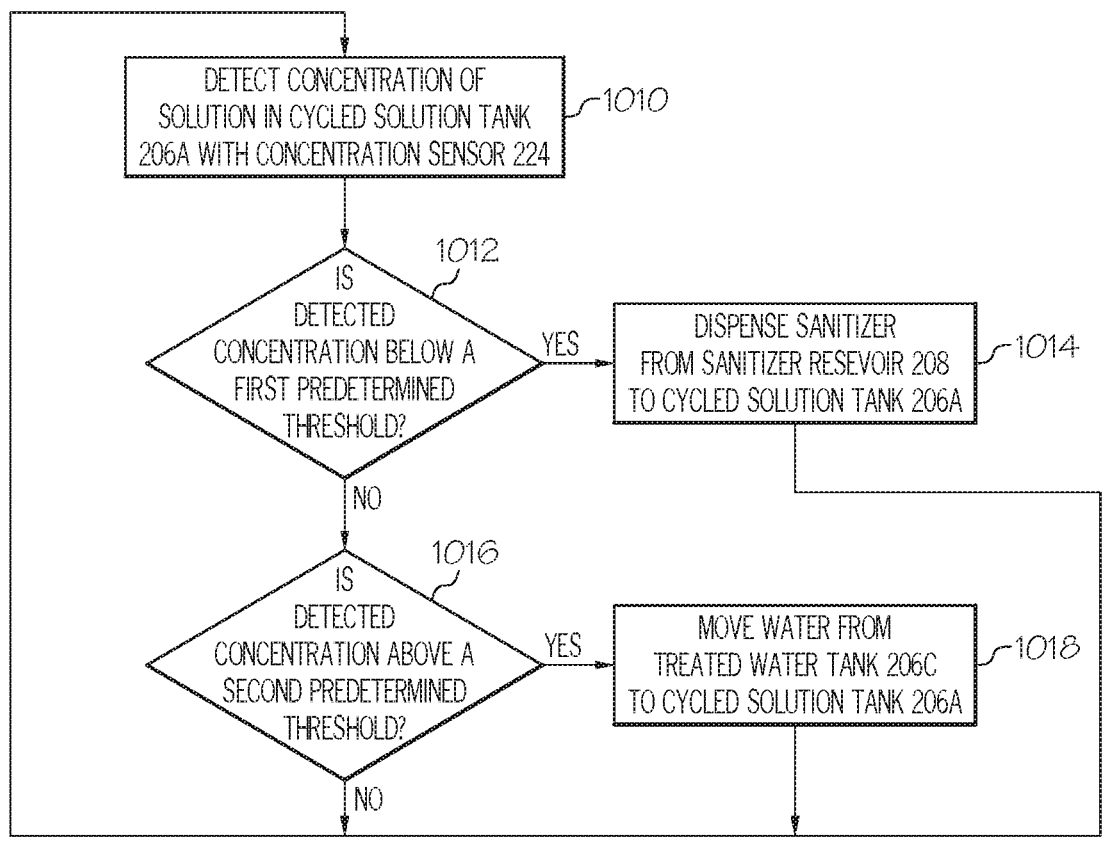
FIG. 10 schematically depicts a flow diagram of an illustrative method of managing sanitizer within a sanitizer solution in an assembly line grow pod, according to one or more embodiments shown and described herein.

Referring collectively to FIGS. 1, 2, and 10, an example method for managing a sanitizer level in sanitizer solution within an assembly line grow pod 100 is depicted. In a first block 1010, a concentration of sanitizer in a sanitizer solution within the cycled solution tank 206a is detected with the concentration sensor 224. At block 1012, if the detected concentration of sanitizer is below a first predetermined threshold, then at block 1014, sanitizer from the sanitizer reservoir 208 is dispensed to the cycled solution tank 206a. If the detected concentration of sanitizer is not below the first predetermined threshold, then the system (e.g., the master controller 106) proceeds to block 1016. At block 1016, if the detected concentration of sanitizer is above a second predetermined threshold, then at block 1018, water is moved from the treated water tank 206c to the cycled solution tank 206a. If the detected concentration of solution is not above the second predetermined threshold, the system (e.g., the master controller 106) returns to block 1010.

The blocks described above may be directed by the master controller 106, such as by directing the sanitizer reservoir 208 to release sanitizer to the cycled solution tank 206a and/or moving water between the treated water tank 206c and the cycled solution tank 206a via the one or more water lines 110, as described above. Additionally, the method depicted in FIG. 10 may be utilized simultaneously with other methods for managing water in the assembly line grow pod 100, for example, the methods described above with respect to FIGS. 5, 6, 7, 8, and 9.

In embodiments, the first predetermined threshold may be selected to be any appropriate value to ensure that an appropriate minimum amount of sanitizer is present in the sanitizer solution within the cycled solution tank 206a. In one example, the first predetermined threshold may be any value greater than zero. In other embodiments, the first predetermined threshold may be 5% solution by volume, 10% solution by volume, 15% solution by volume, or 20% solution by volume. The second predetermined threshold may be selected to be any appropriate value to ensure than an appropriate maximum amount of sanitizer is present in the sanitizer solution within the cycled solution tank 206a. In one example, the second predetermined threshold may be any value greater than the first predetermined threshold. By monitoring the concentration of sanitizer in the cycled solution tank 206a with the concentration sensor 224 and selectively adding sanitizer from the sanitizer reservoir 208 or water from the treated water tank 206c, the concentration of sanitizer within the sanitizer solution may be automatically maintained at an appropriate level for use with the sanitizer device 120.

As illustrated above, various embodiments for measuring water usage in an assembly line grow pod are disclosed. These embodiments provide an ability to minimize the amount of water that is used by the assembly line grow pod and/or maximize the amount of water that is reused by the assembly line grow pod.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums measuring water usage in an assembly line grow pod. It should also be understood that these embodiments are merely exemplary and are not intended to limit the scope of this disclosure.

What is claimed is:

1. A method for growing plant matter within an assembly line grow pod, the method comprising:
   moving a cart carrying plant matter along a track;
   dispensing water to the plant matter on the cart;
   collecting water runoff from the dispensing of the water to the plant matter;
   moving the collected water runoff to an untreated water tank that is fluidly coupled to a treated water tank;
   moving the cart to a sanitizer device of the assembly line grow pod;
   dispensing a sanitizer solution to the cart with the sanitizer device;
   collecting sanitizer solution runoff from the dispensing of the sanitizer solution to the cart;
   moving the collected sanitizer solution runoff to a gray solution tank that is fluidly coupled to a cycled solution tank;
   measuring at least one of a flow rate of the sanitizer solution dispensed to the cart and a flow rate of the collected sanitizer solution runoff moved to the gray solution tank; and
   based at least in part on the measured flow rate of the sanitizer solution dispensed to the cart or the measured flow rate of the collected sanitizer solution runoff to the gray solution tank, moving water from the treated water tank to the cycled solution tank.

2. The method of claim 1, further comprising filtering the collected water runoff in the untreated water tank to obtain filtered water, and moving the filtered water to the treated water tank.

3. The method of claim 2, further comprising increasing a volume of the filtered water moved to the treated water tank based at least in part on the at least one of the measured flow rate of the sanitizer solution dispensed to the cart and the measured flow rate of the collected sanitizer solution runoff moved to the gray solution tank.

4. The method of claim 1, further comprising filtering the sanitizer solution runoff in the gray solution tank, and moving the filtered sanitizer solution to the cycled solution tank.

5. The method of claim 4, wherein dispensing sanitizer solution to the cart comprises moving the filtered sanitizer solution from the cycled solution tank to the sanitizer device.

6. The method of claim 4, further comprising measuring the flow rate of the sanitizer solution dispensed to the cart and measuring the flow rate of the collected sanitizer solution runoff moved to the gray solution tank.

7. The method of claim 6, further comprising:
   determining that the measured flow rate of the sanitizer solution dispensed to the cart exceeds the measured flow rate of the collected sanitizer solution runoff moved to the gray solution tank by a predetermined threshold; and
   in response to determining that the measured flow rate of the sanitizer solution dispensed to the cart exceeds the measured flow rate of the collected sanitizer solution runoff moved to the gray solution tank by the predetermined threshold, moving water from the treated water tank to the cycled solution tank.

8. The method of claim 4, further comprising:
   measuring a flow rate of the filtered sanitizer solution moved to the cycled solution tank from the gray solution tank;
   determining that the measured flow rate of the filtered sanitizer solution moved to the cycled solution tank is below a predetermined threshold; and
   in response to determining that the measured flow rate of the filtered sanitizer solution moved to the cycled solution tank is below the predetermined threshold, moving water from the treated water tank to the cycled solution tank.

9. The method of claim 8, further comprising, in response to determining that the measured flow rate of the filtered sanitizer solution moved to the cycled solution tank is below the predetermined threshold, filtering water in the untreated water tank and moving the filtered water to the treated water tank.

10. A method for growing plant matter within an assembly line grow pod, the method comprising:
    dispensing water to plant matter on a cart;
    collecting water runoff from the dispensing of the water to the plant matter;
    filtering the collected water runoff and storing the filtered water in a treated water tank;
    dispensing a sanitizer solution to the cart;
    collecting sanitizer solution runoff from the dispensing of the sanitizer solution to the cart;
    measuring a flow rate of the sanitizer solution dispensed to the cart;
    filtering the sanitizer solution runoff and storing the filtered sanitizer solution in a cycled solution tank;
    increasing a volume of the sanitizer solution runoff filtered based at least in part on the measured flow rate of the sanitizer solution dispensed to the cart.

11. The method of claim 10, wherein filtering the sanitizer solution runoff comprises moving the sanitizer solution runoff from a gray solution tank through a filter.

12. The method of claim 10, further comprising, in response to determining that the measured flow rate of the sanitizer solution exceeds a predetermined threshold, reducing a volume of the sanitizer solution applied to the cart.

13. The method of claim 10, further comprising:
    moving water from the treated water tank to the cycled solution tank;
    measuring a flow rate of the water dispensed to the plant matter on the cart;
    determining that the measured flow rate of the water dispensed to the plant matter exceeds a predetermined threshold;
    in response to determining that the measured flow rate of the water dispensed to the plant matter exceeds the predetermined threshold, reducing a volume of the water moved to the cycled solution tank from the treated water tank.

14. The method of claim 13, further comprising, in response to determining that the measured flow rate of the water dispensed to the plant matter exceeds the predetermined threshold, increasing a volume of the sanitizer solution runoff filtered and moved to the cycled solution tank.

15. The method of claim 10, wherein dispensing the sanitizer solution to the cart comprises moving the filtered sanitizer solution to a sanitizer device and dispensing the filtered sanitizer solution with the sanitizer device.

16. The method of claim 10, wherein dispensing the water to the plant matter comprises moving the filtered water runoff to a watering system, and dispensing the filtered water runoff to the plant matter.

* * * * *